US008432387B2

(12) United States Patent
Lee

(10) Patent No.: US 8,432,387 B2
(45) Date of Patent: Apr. 30, 2013

(54) ELECTROPHORESIS DISPLAY AND DRIVING METHOD THEREOF

(75) Inventor: Chul-Kwon Lee, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 677 days.

(21) Appl. No.: 12/638,651

(22) Filed: Dec. 15, 2009

(65) Prior Publication Data

US 2010/0149158 A1 Jun. 17, 2010

(30) Foreign Application Priority Data

Dec. 17, 2008 (KR) ........................ 10-2008-0128470

(51) Int. Cl.
*G06F 3/038* (2006.01)
*G09G 5/00* (2006.01)

(52) U.S. Cl.
USPC .......................................................... 345/211

(58) Field of Classification Search .................. 345/211, 345/107, 208, 214, 209, 690; 347/112
See application file for complete search history.

(56) References Cited

U.S. PATENT DOCUMENTS 6,922,204 B2 * 7/2005 Kanazawa et al. ............ 347/112
7,012,600 B2 3/2006 Zehner et al.
7,118,772 B2 10/2006 Froseth et al.
7,612,760 B2 * 11/2009 Kawai ........................... 345/107
7,868,869 B2 * 1/2011 Shin et al. ...................... 345/107
8,054,288 B2 * 11/2011 Sugita et al. .................. 345/107
2006/0055713 A1 * 3/2006 Asao et al. .................... 345/690
2008/0143700 A1 6/2008 Shin et al.
2009/0167754 A1 * 7/2009 Hatta ............................ 345/214

FOREIGN PATENT DOCUMENTS

CN 101206371 A 6/2008

OTHER PUBLICATIONS

Office Action issued in corresponding German Patent Application No. 10-2009-0590164.8, mailed Oct. 28, 2011.
Office Action issued in corresponding Chinese Patent Application No. 200910261046.8, mailed Feb. 23, 2012.

* cited by examiner

*Primary Examiner* — Fred Tzeng
(74) *Attorney, Agent, or Firm* — Brinks Hofer Gilson & Lione

(57) ABSTRACT

An electrophoresis display and a driving method thereof are disclosed. An electrophoresis display includes a display panel comprising a plurality of pixel cells to display an image, a data driving unit supplying a pixel voltage to a plurality of data lines provided in the display panel, a common voltage generating unit generating a common voltage swinging to reverse electric potential and supplying the common voltage to a common electrode of the display panel, and a timing control unit generating a data control signal and a common voltage control signal and controlling a driving timing of the data driving unit and the common voltage generating unit.

6 Claims, 5 Drawing Sheets

ELECTROPHORESIS DISPLAY AND DRIVING METHOD THEREOF

This application claims the benefit of Korea Patent Application No. 10-2008-0128470, filed on Dec. 17, 2008, the entire contents of which is incorporated herein by reference for all purposes as if fully set forth herein.

BACKGROUND

1. Field of the Invention

The present invention relates to an electrophoresis display, more particularly, to an electrophoresis display that is able to reduce the size of circuits for driving a display panel by decreasing driving voltages required to display images and the unit cost of the product.

2. Discussion of the Related Art

If placed in a direct current electric field, material having electric charge will move according to the size and shape of the electric charge and molecule. Such the movement is referenced to as electrophoresis and also to as phenomenon that material is separated according to the difference of movement.

Recently, a display using such the electrophoresis comes to the forefront as means that can replace paper. A display using such the conventional electrophoresis is disclosed in U.S. Pat. No. 7,012,600 and U.S. Pat. No. 7,118,772.

According to a conventional electrophoresis display, data which is input currently is compared with data which will be input in every cell by using look-up table, a plurality of memories and frame counter to determined data that is supplied to every cell for a plurality of frame periods based on the result of the comparison.

Data output in the look-up table is digital data such as 2 bit and the data is converted into three pixel voltages supplied to a pixel electrode of each cell, for example, +15V, −15V and 0V.

However, a conventional electrophoresis display has to store and compare all of the data input currently and that will be input. As a result, there is a problem that the storage capacity of the used memories should be large as much. In addition, the pixel voltage and gate voltage for driving each of the pixels would be relatively high, compared with the other kinds of displays. Because of the relatively high voltage, circuit devices such as data drive integrated circuit should be configured of high voltage devices. The size of the data drive integrated circuit should be large and the unit price of the product should be high accordingly.

BRIEF SUMMARY

An electrophoresis display includes a display panel comprising a plurality of pixel cells to display an image; a data driving unit supplying a pixel voltage to a plurality of data lines provided in the display panel; a common voltage generating unit generating a common voltage swinging to reverse electric potential and supplying the common voltage to a common electrode of the display panel; and a timing control unit generating a data control signal and a common voltage control signal and controlling a driving timing of the data driving unit and the common voltage generating unit.

In another aspect of the present disclosure, a driving method of an electrophoresis display comprising a display panel having a plurality of pixel cells to display an image, the driving method comprises the steps of: supplying a pixel voltage to a plurality of data lines provided in the display panel; generating a common voltage swing to reverse electric potential and supplying the common voltage to a common electrode of the display panel; and generating a data control signal and a common voltage control signal and controlling a driving time of the display panel and a supplying timing of the common voltage.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DETAILED DESCRIPTION OF THE DRAWINGS AND THE PRESENTLY PREFERRED EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
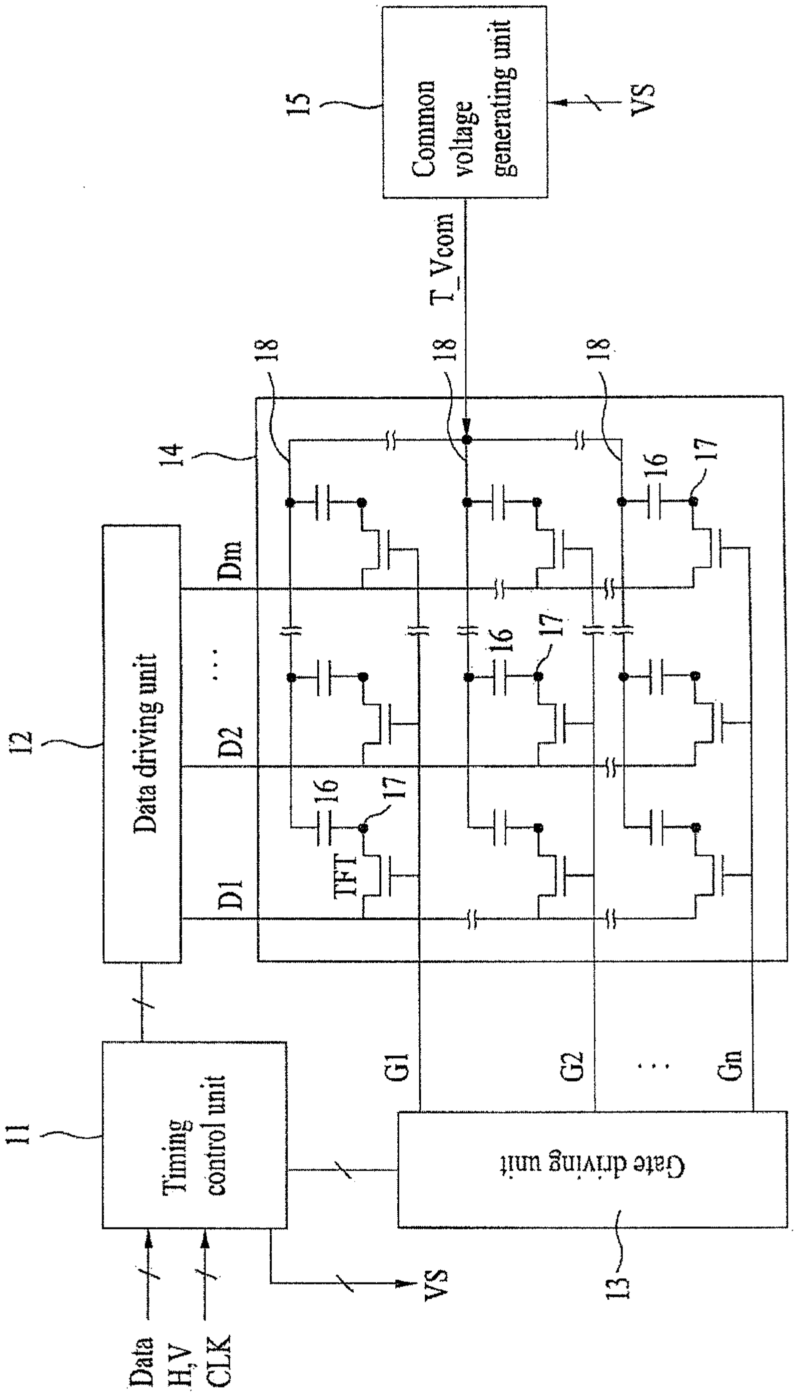
FIG. 1 is a diagram illustrating an electrophoresis display according to an exemplary embodiment of the present invention.
Figure 2:
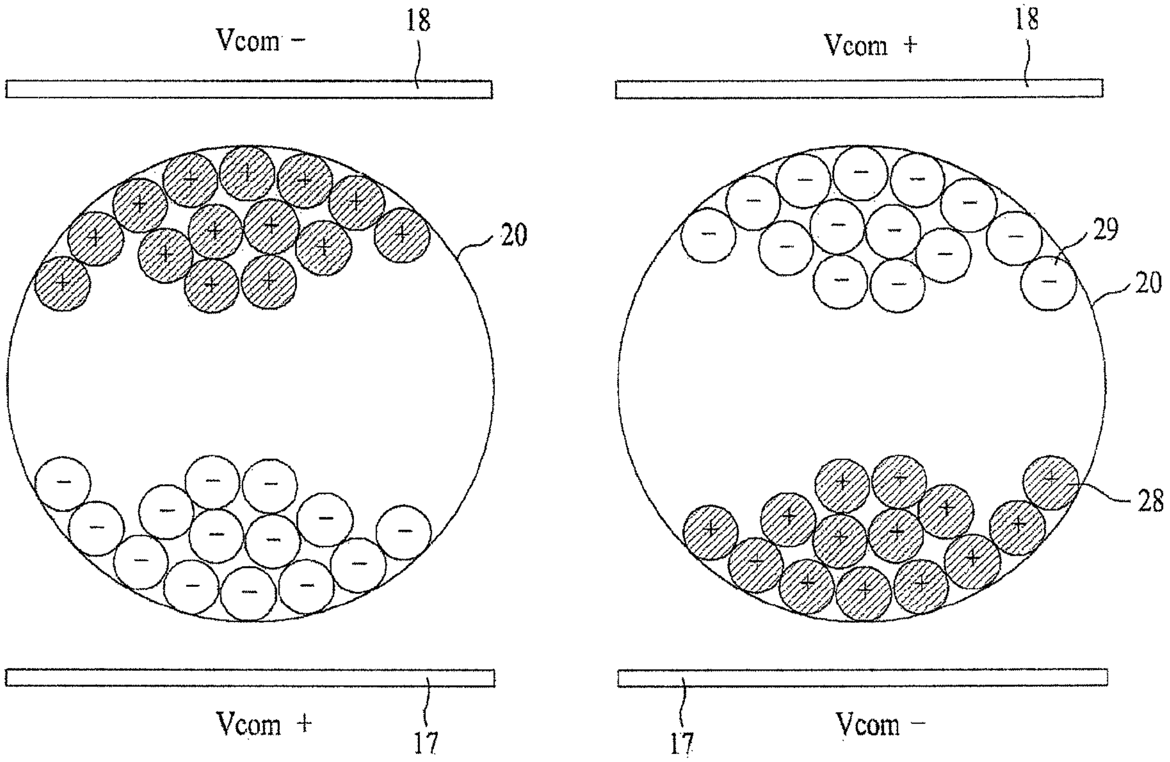
FIG. 2 is a sectional view illustrating pixel cells shown in FIG. 1.

FIG. 1 is a diagram illustrating an electrophoresis display according to an exemplary embodiment of the present invention. FIG. 2 is a sectional view illustrating pixel cells shown in FIG. 1.

The electrophoresis display shown in FIG. 1 includes a display panel 14, a data driving unit 12, a gate driving unit 13, a common voltage generating unit 15 and a timing control unit 11. the display panel 14 includes m*n pixels 16 to display images. The data driving unit 12 supplies a pixel voltage to a plurality of data lines (D1 to Dm) provided in the display panel 14. The gate driving unit 13 drives a plurality of gates lines (G1 to Gn) provided in the display panel 14. The common voltage generating unit 15 generates a common voltage (T_vcom) swing to reverse electric potential and it supplies the common voltage to a common electrode 18 of the display panel 14. The timing control unit 11 generated gate/data signals and common voltage control signals (VS) to control the driving timing of the gate and data driving units 13 and 12 and the common voltage generating unit 15.

As shown in FIGS. 1 and 2, a film having a plurality of microcapsules 20 may be provided between upper and lower substrates in the display panel 14. Each of the microcapsules 20 includes white particles 29 negatively charged and black particles 28 positively charged. On the lower substrate are crossed the data lines (D1 to Dm) and the gate lines (G1 to Gn). Thin film transistor (TFT) is connected to a pixel region defined by the inter-cross of the data and gate lines (D1 to Dm and G1 to Gn), that is, each of pixel cells 16. Source electrodes of the TFTs are connected to the data lines (D1 to Dm), respectively, and drain electrodes are connected to the pixel electrodes 17 of the pixel cells 16, respectively. Gate electrodes of the TFTs are connected to the gate lines (G1 to Gn), respectively. The TFTs are tuned on in response to scan pulses input via the gate lines (G1 to Gn) and horizontal lined pixel cells 16 desired to display are selected. On the upper substrate of the display panel 14 may be provided the common electrode 18 for supplying the common voltage (T_Vcom) swinging to reverse electric potential to each of the pixel cells 16 simultaneously.

The microcapsules 20 according to the present invention may include black particles negatively charged and white particles positively charged. In this case, a waveform of a driving voltage which will be described later, that is, phases of the pixel voltage and common voltage may change.

The data driving unit 12 may be configured of a plurality of data drive integrated circuits and each data drive integrated circuit includes a shift register unit, a latch, a digital-analog converter and an output buffer. The data driving unit 12 latches digital image data according to the data control signal transmitted by the timing control unit 11 and it converts the digital image data into an analog voltage to generate the pixel voltage (Vdata). The generated pixel voltage (Vdata) is supplied to the data lines (D1 to Dm). A level of the pixel voltage (Vdata) generated by the data driving unit 12 may be changeably established based on a level of the common voltage (T_Vcom) having electric potential alternatively swing-reversed. That is, each level of the pixel voltages (Vdata) may be decreased and established based on the swing level of the reversible common voltage (T_Vcom) by a user. The range of the established levels of the pixel voltage (Vdata) will be described in detail in referenced to the accompanying drawings later.

The gate driving unit 13 may be configured of a plurality of gate drive integrated circuits and each of the gate drive integrated circuits includes a shift register outputting scan pulses sequentially, a level shifter converting the pulse width of scan pulses output from the shift register into the pulse width appropriately corresponding to the drive of the TFT, an output buffer connected between the level shifter and the gate lines (G1 to Gn). The gate driving unit 13 having the above configuration sequentially outputs scan pulses, for example, gate-on voltages to be synchronized to the pixel voltages (Vdata) supplied to the data lines (D1 to Dm).

The timing control unit 11 generates data/gate control signals for controlling the driving timing of the data and gate driving units 12 and 13 by using vertical and horizontal signals (V and H) and clock signals (CLK) and it also generates a common voltage control signal (VS) for controlling the driving timing of the common voltage generating unit 15.

Moreover, the timing control unit 11 compares image data of the current frame with image data of the next frame stored in the memory and it determines a driving waveform of the pixel voltage (Vdata) and common voltage (T_Vcom) based on the result of the comparison. The timing control unit 11 generates digital image data corresponding to the driving waveform of the pixel voltage (Vdata) by using the frame counter counting the number of frames and it supplies the generated digital image data to the data driving unit 12.

The common voltage generating unit 15 generates the common voltage (T_Vcom) repeatedly swung between a positive, that is, high potential common voltage (Vcom+) and a negative, that is, low potential common voltage (Vcom−) and it supplies the common voltage (T_vcom) having electric potential swung alternatively to the common electrode 18 of the display panel 14. Here, the electric potential of the common voltage (T_Vcom) may be reversed per at least one frame based on the common voltage control signal (VS).

Figure 3:
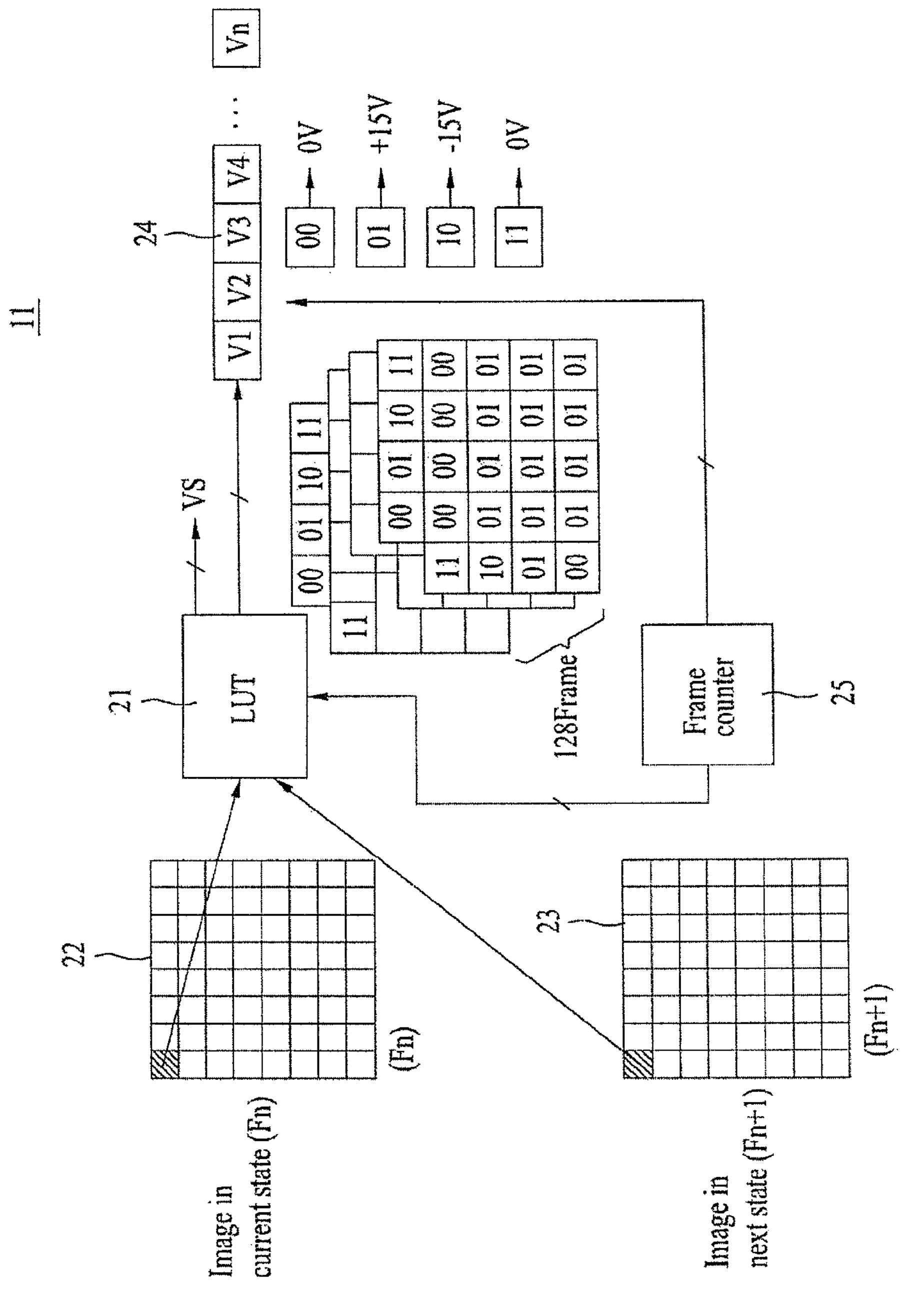
FIG. 3 is a diagram specifically illustrating a timing control unit shown in FIG. 1.

FIG. 3 is a diagram illustrating the timing control unit shown in FIG. 1 in detail.

The timing control unit 11 shown in FIG. 3 includes a first frame memory 22, a second frame memory 23, a look-up table 21 and a data memory 24. the first frame memory 22 stores image data of a current frame (Fn) and the second frame memory 23 stores image data of the next frame (Fn+1). The look-up table 21 compares the image data of the current frame (Fn) with the image data of the next frame (Fn+1) and it determines digital image data (V1 to Vn) that will be displayed in each of the pixel cells 16 for the plural frame periods based on the result of the comparison. Also, the look-up table 21 outputs a common voltage control signal (VS) corresponding to the output timing of the digital data (V1 to Vn). The data memory 24 stores the digital image data output from the frame counter 25 counting the number of the frames and the look-up table 21. Here, the data memory 24 may be a latch included in an integrated circuit of a data driving circuit 12 which will be described later.

The look-up table 21 stores information on the driving waveform of the pixel voltage (Vdata) supplied to each of the pixel cells 16 for the frame periods according to the image data of the current frame (Fn) and the image data of the next frame (Fn+1) and the driving waveform of the common voltage (T_Vcom). Specifically, the look-up table 21 compares the image data of the frame in the current state (Fn) with the image data of the next frame (Fn+1) per pixel cell 16 with respect to every frame indicated by the number of the frames counted by the frame counter 25. Hence, the look-up table 21 selects 2 bit digital image data of each pixel cell unit based on the result of the comparison. Here, the digital image data of each pixel cell 16 selected by the look-up table 21 includes reset data for initializing the former state of the cell, stabilization data for stabilizing bistable in each pixel cell 16 and write data for expressing gray scale.

The look-up table 21 selects a common voltage control signal (TS) indicating a waveform of the common voltage (T_Vcom) predetermined according to the output timing of the digital image data (V1 to Vn) and it supplies the common voltage control signal (TS) to the common voltage generating circuit 15. the data (V1 to Vn) output from the look-up table 21 that is digital image data such as '00', '01', '10' and '11' may be converted into three pixel voltages (Vdata), for example, Vdata(+), Vdata(−) and Vdata(0). For example, '00' or '11' may be converted into a pixel voltage of OV (Vdata(0)) and '01' into a pixel voltage of +15V (Vdata(+15)) and '10' into a pixel voltage of −15V (Vdata(−15)).

Figure 4:
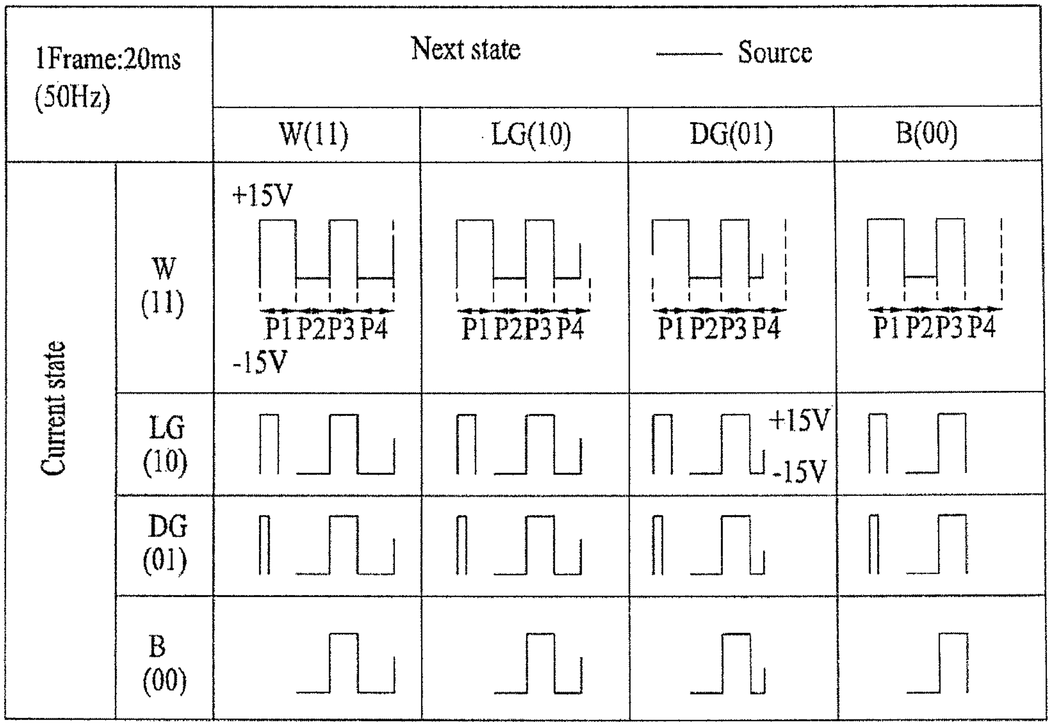
FIG. 4 is a diagram illustrating a waveform of a pixel voltage supplied for a plurality of frame periods according to image data in a current state and image data which will be written in the next state.

FIG. 4 is a diagram illustrating the waveform of the pixel voltage supplied according to image data in a current state and image data which will be written in the next state for the plurality of frame periods.

According to FIG. 4, 'W(11)' is referenced to as peak white gray scale and 'LG(10)' is referenced to as peak black gray scale. The number written under the waveform of the pixel voltage is referenced to as the number of the frames.

As shown in FIG. 4, the look-up table 21 compares the image data of the current frame (Fn) and the image data of the next frame (Fn+1) with respect to each gray scale, for example, W(11), LG(10), DG(01) and B(00). Also, the look-up table 21 stores information on the driving waveform of the pixel voltage (Vdata) that is selected according to the result of the comparison.

The driving waveform of the pixel voltage (Vdata) includes a driving waveform of the reset data that is generated for a reset period (P1) including approximately 35 frame periods, a driving waveform of the first stabilization data that is generated for a first-stabilization period (P2) including approximately 25 frame periods, a driving waveform of the second stabilization data that is generated for a second-stabilization period (P3) including approximately 25 frame periods, and a driving waveform of the write data that is generated for a gray scale period (P4) including approximately 35 frame periods.

The arrangement of the white particles 29 negatively charged in the microcapsule 20 and the black particles 28 positively charged in the microcapsule 20 is different in each of the pixel cells 16 for the reset period (P1). Because of that, a white display voltage, that is, reset voltage is supplied to the pixel electrode 17 of each pixel cell 16 for predetermined frame periods within the reset periods (P1), such that the particle arrangement within the microcapsule 20 provided in each of the pixel cells 16 is initialized primarily. The driving waveform of the reset data has the number of the frames receiving the reset voltage to be larger as the difference between the current frame data and the next frame data is larger.

The first and second stabilization data, for example, white display voltage and black display voltage may be supplied alternatively for the first and second stabilization periods (P2 and P3) such that the white particles 29 negatively charged in the microcapsule 20 and the black particles 28 positively charged in the microcapsule 20 are separated from each other to secondarily initialize the particle arrangement within the microcapsule 20 provided in each of the pixel cells 16 in bistable. The first and second stabilization periods (P2 and P3) are identical regardless of gray scale difference between the current frame data and the former frame data.

The write data supplies voltages (0V, +15V, −15V and 0V) representing one of 4 gray scales to the pixel electrode 17 of the bistable microcapsule 20 to represent the gray scale. The write data has the number of the frames receiving the white display voltage to be smaller as the gray scale is lower. That is, the number of the pixel voltage (Vdata) receiving frames for displaying white color is controlled by controlling pulse width modulation of the driving waveform within the gray scale write periods (P4), such that gray scale may be represented.

Figure 5:
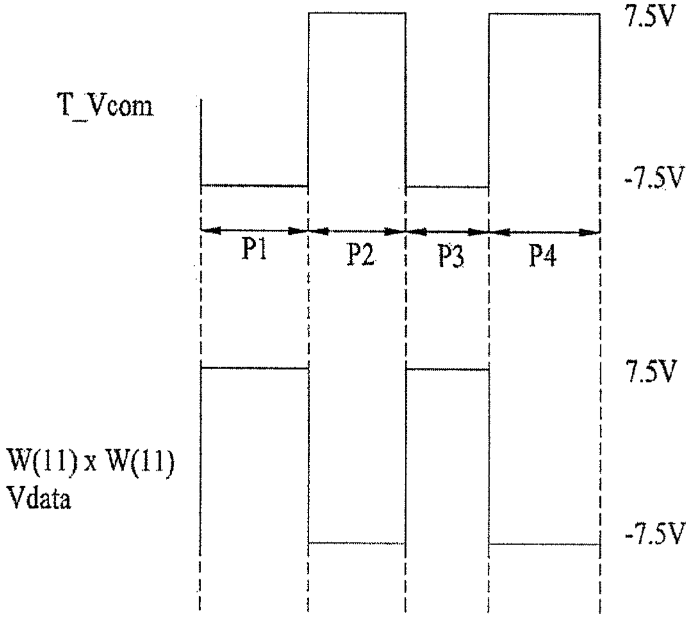
FIG. 5 is a diagram illustrating a driving waveform of the common voltage and the pixel voltage to display white gray scale.

As shown in FIG. 5, the common voltage (T_Vcom) is supplied to the common electrode 18 opposite to the pixel electrode 17 and the common voltage (T_Vcom) swing to reverse electric potential per at least one frame.

Specifically, the common voltage generating unit 15 according to the present invention reverses the electric potential of the common voltage (T_Vcom) by the reset period (P1), first stabilization period (P2), second stabilization period (P3) and gray scale period (P4). That is, as shown in FIG. 5, the electric potential of the common voltage (T_Vcom) is supplied in a negative state for the reset period (P1) and in a positive state for the first stabilization period (P2), and also it is supplied in a negative state for the second stabilization period (P3) again and in a positive state for the gray scale period (P4).

As a result, the white particles 29 negatively charged and the black particles 28 positively charged may move within the microcapsule 20 according to the potential difference between the pixel voltage (Vdata) supplied to the pixel electrode 18 and the common voltage (T_Vcom), only to display images.

if it is premised that the white particles are charged negatively as shown in FIG. 2, the white voltage for displaying white color is negative, that is, low electric potential pixel voltage (Vdata−) as shown in FIG. 4. At this time, the common voltage (T_Vcom) is supplied in a positive, that is, high electric potential state and in contrast the black voltage may be a positive, that is, high electric potential pixel voltage (Vdata+). In case the white particles are charged positively, the white voltage and the black voltage may be in reverse.

As mentioned above, the common voltage (T_Vcom) supplied to the common electrode 18 for the gray scale period (P4) is supplied only in a positive electric potential state. As only the positive electric potential common voltage (T_Vcom) is supplied to the common electrode 18 during the gray scale period (P4), the negative pixel voltage (Vdata−) is supplied to the pixel electrode 17 and white gray scale may be written for predetermined frame periods. If not writing the white gray scale, the positive pixel voltage (Vdata+) is supplied to the pixel electrode 17 of the pixel cell 16 and levels of the common voltage (T_Vcom) and the pixel voltage (Vdata) are maintained identically, for example, +15V.

According to the embodiment of the present invention, a single data is written per pixel cell unit for the plurality of the frame periods, for example, 128 frame periods, including initialization, stabilization and data write processes. Here, the level of the positive pixel voltage (Vdata+) supplied to the pixel electrode 17 and the level of the negative pixel voltage (Vdata−) may be changeably established according to the swing level of the common voltage (T_Vcom).

Specifically, in reference to FIG. 5, if the swing level of the common voltage (T_Vcom) is swung into 7.5V positive electric potential and −7.5 negative electric potential, the positive and negative pixel voltages (Vdata) level may be preset as 7.5V positive (7.5+) and 7.5 negative (7.5−) according to the swing level of the common voltage (T_Vcom). This is because the voltage difference between the common voltage (T_Vcom) and the pixel voltage (Vdata) which are in different electric potential states per every driving period (P1 to P5) of the pixel cells 16 may be 15V. That is, an effective voltage applied to the microcapsule 20 may change based on the interrelation between the pixel voltage (Vdata) and the common voltage (T_Vcom) having electric potential swung. An absolute value of an effective voltage applied to each of the pixel cells 16 is substantially larger than an absolute value of the pixel voltage applied to each of the pixel electrodes 17. As a result, the positive and negative pixel voltages (Vdata) supplied to the pixel electrodes 17 may be changeably preset based on the swing level of the common voltage (T_Vcom).

As mentioned above, the electrophoresis display and the driving method thereof according to the embodiment of the present invention, the electric potential of the common voltage (T_Vcom) supplied to the display panel 14 is changeably provided. Because of that, the driving electricity required to display images, that is, the levels of the pixel voltage (Vdata) and the common voltage (T_Vcom) may be reduced. As a result, the size of the circuit for driving the display panel 14, for example, the data driving unit 12 and the common voltage generating unit 15 may be reduced and the unit price of the product may be lowered accordingly.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An electrophoresis display comprising:

a display panel comprising a plurality of pixel cells to display an image;

a data driving unit that supplies a pixel voltage to a plurality of data lines provided in the display panel;

a common voltage generating unit that generates a common voltage swinging to reverse electric potential and supplies the common voltage to a common electrode of the display panel; and a timing control unit that generates a data control signal and a common voltage control signal and controls a driving timing of the data driving unit and the common voltage generating unit, wherein a microcapsule comprising white particles negatively charged and black particles positively charged, respectively, is provided in each of the plurality of the pixel cells, wherein the common voltage generating unit reverses the electric potential of the common voltage per reset period, first stabilization period, second stabilization period and gray scale period unit while the pixel voltage is supplied to the pixel electrode and the common voltage generating unit supplies the reversed potential common voltage to the common electrode, wherein the common voltage supplied to the common electrode for the gray scale period is supplied only in a positive electric potential state, and wherein the negative pixel voltage is supplied to the pixel electrode and white gray scale may be written, and if not writing the white gray scale, levels of the common voltage and the pixel voltage are maintained identically.

2. The electrophoresis display of claim 1, wherein the timing control unit comprises, a first frame memory storing image data of a current frame;

a second frame memory storing image data of the next frame;

a look-up table that determines digital image data, which will be displayed in each of the pixel cells for a plurality of frame periods, by comparing the image data of the current frame and the image data of the next frame, the look-up table outputting a common voltage control signal based on the output timing of the digital image data;

a frame counter counting the number of the frames; and a data memory storing the digital image data output from the look-up table.

3. The electrophoresis display of claim 2, wherein a positive and negative level of the pixel voltage applied to the pixel electrode is changeably preset according to a swing level of the common voltage.

4. A driving method of an electrophoresis display comprising a display panel having a plurality of pixel cells to display an image, the driving method comprising steps of:

supplying a pixel voltage to a plurality of data lines provided in the display panel;

generating a common voltage swing to reverse electric potential and supplying the common voltage to a common electrode of the display panel; and generating a data control signal and a common voltage control signal and controlling a driving time of the display panel and a supplying timing of the common voltage, wherein a microcapsule comprising white particles negatively charged and black particles positively charged, respectively, is provided in each of the plurality of the pixel cells, wherein the step of supplying the common voltage reverses the electric potential of the common voltage per reset period, first stabilization period, second stabilization period and gray scale period unit while the pixel voltage is supplied to the pixel electrode and the common voltage generating unit supplies the reversed potential common voltage to the common electrode, wherein the common voltage supplied to the common electrode for the gray scale period is supplied only in a positive electric potential state, wherein the negative pixel voltage is supplied to the pixel electrode and white gray scale may be written, and if not writing the white gray scale, levels of the common voltage and the pixel voltage are maintained identically.

5. The driving method of claim 4, wherein the step of controlling the driving timing of the display panel and the supplying timing of the common voltage comprises steps of:

storing image data of a current frame;

storing image data of the next frame;

determining digital image data which will be displayed in each of the pixel cells for a plurality of frame periods by comparing the image data of the current frame and the image data of the next frame, the look-up table outputting a common voltage control signal based on the output timing of the digital image data;

counting the number of the frames; and storing and outputting the digital image data which will be displayed in each of the pixel cells.

6. The driving method of claim 5, wherein a positive and negative level of the pixel voltage applied to the pixel electrode is changeably preset according to a swing level of the common voltage.

* * * * *